(12) United States Patent
Viel

(10) Patent No.: US 11,795,881 B2
(45) Date of Patent: Oct. 24, 2023

(54) ACCESSORY BOX FOR A TURBOMACHINE

(71) Applicant: SAFRAN TRANSMISSION SYSTEMS, Colombes (FR)

(72) Inventor: Julien Viel, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/644,997

(22) PCT Filed: Sep. 5, 2018

(86) PCT No.: PCT/FR2018/052168
§ 371 (c)(1),
(2) Date: Mar. 6, 2020

(87) PCT Pub. No.: WO2019/048778
PCT Pub. Date: Mar. 14, 2019

(65) Prior Publication Data
US 2020/0200092 A1    Jun. 25, 2020

(30) Foreign Application Priority Data

Sep. 7, 2017 (FR) ...................................... 1758259

(51) Int. Cl.
*F02C 7/32* (2006.01)
*F02C 7/36* (2006.01)
(Continued)

(52) U.S. Cl.
CPC .................. *F02C 7/32* (2013.01); *F02C 7/36* (2013.01); *F01D 25/162* (2013.01); *F02C 7/06* (2013.01);
(Continued)

(58) Field of Classification Search
CPC ...... F02C 7/06; F02C 7/32; F02C 7/36; F01D 25/162; F05D 2220/323; F05D 2220/329;
(Continued)

(56) References Cited

U.S. PATENT DOCUMENTS 2,432,358 A * 12/1947 Warner ...................... F02C 7/32
74/665 GA
2011/0198155 A1* 8/2011 Charier ...................... F02C 7/06
184/6.23
(Continued)

FOREIGN PATENT DOCUMENTS

EP     2 390 486 A2    11/2011
FR     2977280         1/2013
(Continued)

OTHER PUBLICATIONS

International Patent Application No. PCT/FR2018/052168, International Search Report and Written Opinion dated Oct. 22, 2018, 10 pgs.

*Primary Examiner* — Loren C Edwards
(74) *Attorney, Agent, or Firm* — Cozen O'Connor

(57) ABSTRACT

The invention relates to an accessory relay box (10, 110, 210) for a turbomachine having a front lateral face (16, 116, 216), a rear lateral face (18, 118, 218) opposite the front face laterally delimiting the accessory box in which is mounted at least one gear train composed of several gear wheels (14) meshing together, each gear wheel (14) being carried by a central shaft (28), characterised in that the shafts (28) are guided in rotation by rolling bearings (30) all carried by the same support (12, 112, 212) inserted laterally between the front (16, 116, 216) and rear (18, 118, 218) faces.

20 Claims, 2 Drawing Sheets

(51) Int. Cl.
*F01D 25/16* (2006.01)
*F02C 7/06* (2006.01)

(52) U.S. Cl.
CPC .. *F05D 2220/323* (2013.01); *F05D 2220/329* (2013.01); *F05D 2220/76* (2013.01); *F05D 2240/14* (2013.01); *F05D 2240/60* (2013.01); *F05D 2250/70* (2013.01); *F05D 2260/4031* (2013.01); *F05D 2260/53* (2013.01)

(58) Field of Classification Search
CPC ............ F05D 2220/76; F05D 2240/14; F05D 2240/50; F05D 2240/60; F05D 2250/70; F05D 2260/4031; F05D 2260/53
See application file for complete search history.

(56) References Cited

U.S. PATENT DOCUMENTS

| | | | | |
|---|---|---|---|---|
| 2011/0284328 | A1* | 11/2011 | Brandt | F01D 25/18 |
| | | | | 184/6.11 |
| 2012/0006137 | A1* | 1/2012 | Short | F02C 7/32 |
| | | | | 74/460 |
| 2014/0130628 | A1* | 5/2014 | Abousleiman | F16H 57/021 |
| | | | | 74/412 R |
| 2017/0122214 | A1* | 5/2017 | Morelli | F16H 1/20 |
| 2017/0314474 | A1* | 11/2017 | Wotzak | F02C 7/06 |

FOREIGN PATENT DOCUMENTS

| | | |
|---|---|---|
| GB | 590 419 A | 7/1947 |
| WO | WO 2014/112988 A1 | 7/2014 |

\* cited by examiner

ACCESSORY BOX FOR A TURBOMACHINE

CROSS-REFERENCE TO RELATED APPLICATIONS

This application is a 35 U.S.C. § 371 filing of International Application No. PCT/FR2018/052168 filed Sep. 5, 2018, which claims the benefit of priority to French Patent Application No. 1758259 filed Sep. 7, 2017, each of which is incorporated herein by reference in its entirety.

FIELD OF THE INVENTION

The present invention relates to the general field of gas turbines and more particularly relates to a box for driving accessories of a gas turbine.

BACKGROUND OF THE INVENTION

The field of application of the invention is that of gas turbines for airplane or helicopter engines, as well as for Auxiliary Power Units (APUs).

Gas turbine engines for airplanes or helicopters generally have a casing for driving several turbine accessories or ancillary equipment, such as various pumps for hydropower generation, fuel supply, lubrication, electrical generators for power generation, etc. Such an accessory relay box is commonly referred to as an AGB for "Accessory GearBox".

In a manner known per se, an accessory relay box comprises one or more gear train(s) which is/are each composed of several gear wheels and which is/are driven in rotation by a power transmission shaft, the latter being coupled to a turbine shaft. As illustrated, for example, by the applicant's application FR2928696, each accessory is generally mounted against one of the lateral faces of the box and has a supply shaft which is coupled to one of the gear wheels of the gear train(s). In addition to this function as a support for accessories, these lateral faces also act as a support for sealing or lubricating bearings.

These multiple functions provided by the two lateral faces of the box have the consequence of making these boxes particularly complex parts the manufacture of which is delicate because, in addition to their large dimensions, of the manufacturing tolerances required. In addition, boxes for driving accessories, which to date are mainly produced by a time-consuming and expensive casting or mass machining process that needs to be significantly reduced.

It is also known from the application FR2977280 to guide each shaft carrying a gear wheel by two rolling bearings carried by a support, said bearings being attached on a support integral with a peripheral rim of the box. However, this type of assembly is quite cumbersome due to the integration of a rolling bearing at each end of each shaft. It also has the disadvantage of complicating the assembly operations and the rib chains of the kinematic chain because many parts are involved in its realization.

SUMMARY OF THE INVENTION

The present invention relates to an accessory relay box for a turbomachine having a front lateral face, a rear lateral face opposite the front face laterally delimiting the accessory box in which is mounted at least one gear train composed of several gear wheels meshing together, each gear wheel being carried by a central shaft, characterised in that the shafts are guided in rotation by rolling bearings all carried by the same support interposed laterally between the front and rear faces.

According to the invention, each shaft is guided in rotation by one or more rolling bearing(s) all carried by the same support interposed between the front and rear faces, which makes it possible to reduce the thickness (in a direction perpendicular to the front and rear faces) compared to a box architecture of the prior technique. In this configuration, the gear wheels are arranged on either side of said support in a cantilevered arrangement, i.e. all the rolling bearings supporting the gear wheels are located on only one side of said gears, in contrast to the arrangements in the prior technique where the bearings are on either side of the gear wheels. This allows the bearings to be supported by only one support part, simplifying the assembly of the kinematic chain, part inspection, machining, etc. . . . .

The proposed mounting allows the bearing support function to be separated from the other functions of the front or rear lateral faces, thus facilitating the design of these faces and limiting their functions to a sealing function. These front and rear faces can thus be easily designed without imposing a specific manufacturing technique.

In addition, the manufacturing of the box is simplified since the rolling bearings are all centered in housings formed on the same part, which also reduces the machining time of the support.

Also, the meshing forces are taken up by the central bearing support and the static and dynamic equipment support forces are taken up by the front and rear faces. This design makes it possible to topologically optimize each of the parts due to the dissociated functions between the take-up of the meshing forces and the structural forces.

For this purpose, structural calculations can be performed to optimize the shape and dimensions of the support. There is therefore no more material used unnecessarily, unlike the previous technique which mixes the two functions on several parts.

In one embodiment, said support is formed by a perforated plate having a lattice shape comprising a plurality of housings for receiving rolling bearings. The openings thus make it possible to reduce the mass of the support.

Preferably, the support may include means for attaching the casing to a gas turbine casing. The design of these means is also made simpler by the use of a single support for the bearings.

At least one of the front and rear faces can support equipment.

The box and its front and rear faces supporting the equipment may be arranged in any angular orientation with respect to the axis of the shaft of the turbomachine equipped with said accessory box. The box can thus be located at any point on the engine, e.g. in the space between the primary and secondary jets or in the surrounding nacelle, etc.

According to another characteristic, the front and rear faces are advantageously connected to each other by a peripheral rim forming a sealed enclosure with said front and rear faces.

According to a particular embodiment, the front and rear faces are formed on a one-piece box comprising a mounting opening for the aforementioned support.

In one embodiment, the box comprises a shutter which is integral with said support and which is capable of closing the opening.

Preferably, the support includes means for lubricating the rolling bearings, and gears, which is made simple by the use of a single support piece supporting bearings. In an alternative design the lubrication of the kinematic chain can be achieved by a dedicated external pipe and attached to the support part by an adequate fastening system.

The invention also relates to a gas turbine engine of aeroplanes or helicopters, comprising an accessory box as described above.

The invention will be better understood and other details, characteristics and advantages of the invention will appear when reading the following description, which is given as a non-limiting example, with reference to the attached drawings.

DETAILED DESCRIPTION

Figure 1A:
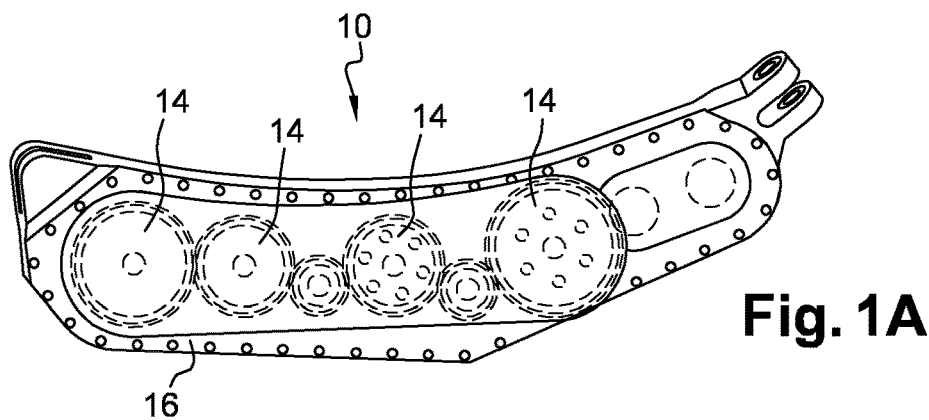
FIGS. 1A, 1B and 1C are schematic views in perspective of a first embodiment of a box for driving accessories according to the invention.
Figure 1B:
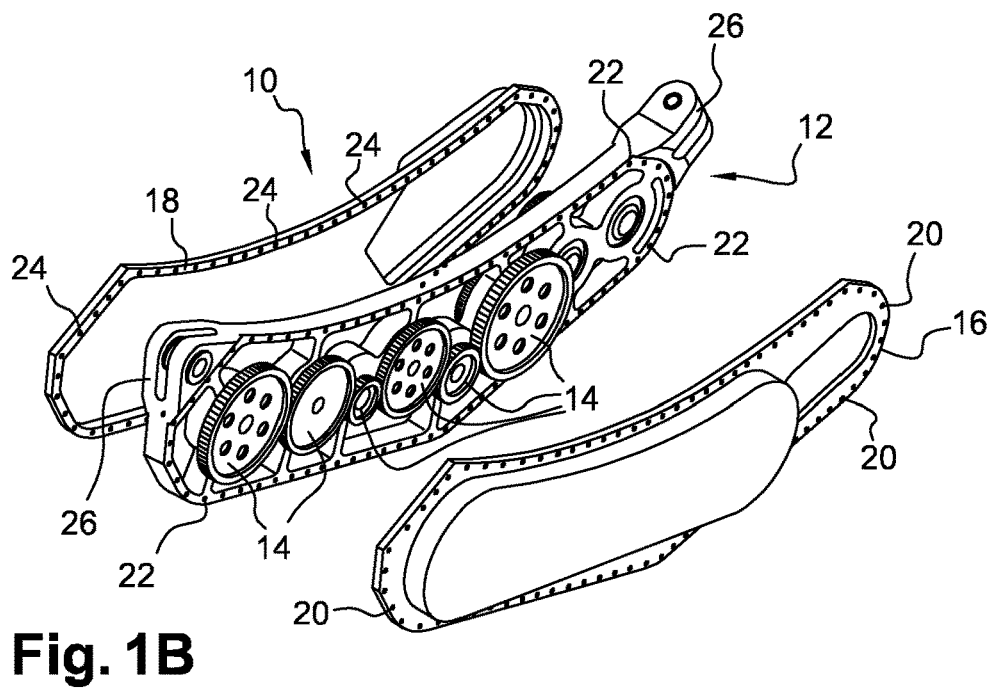
Figure 1C:
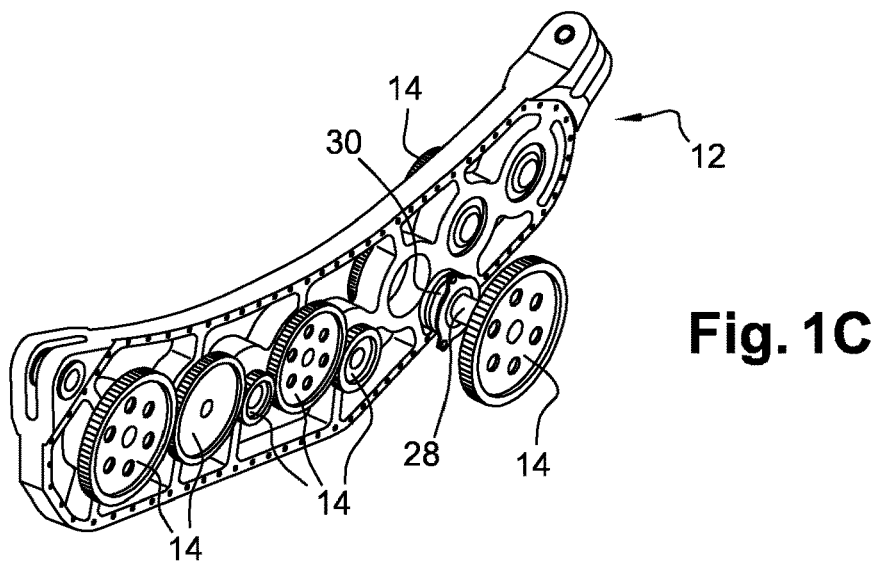

FIGS. 1A, 1B and 1C represent a first embodiment of an accessory relay box 10 of an aircraft engine gas turbine according to the invention, FIG. 1A being a global representation of the box, FIG. 1B being an exploded representation of some of its constituent parts and FIG. 1C being an isolated representation of a gear wheel support 12 14. It is understood that the invention also applies to gas turbines of helicopter engines, as well as to auxiliary power units.

This box 10 has classically a general shape of a substantially parallelepipedal "banana" or "bean" with a front lateral face 16 and a rear lateral face 18 opposite the front face 16 and attached to the latter by means of a support 12 interposed between the front face 16 and the rear face 18. To achieve this connection, the front face 16 comprises a plurality of holes 20 formed on its periphery and cooperating with holes 22 on the periphery of the support 12 and holes 24 on the periphery of the rear face 18. It should be noted that the support 12 comprises two hooking devices 26 each formed by two devises extending outside the enclosure delimited by the front 16 and rear 18 faces. These devises enable the box 10 to be attached to a turbomachine casing. The box 10 contains one or more gear train(s) (or chain(s)) of gears formed by the intermeshing gear wheels 14 which extend parallel to the lateral faces 16, 18 and which conventionally have the function of rotating a plurality of accessories (not shown).

The accessories are each mounted on one of the lateral faces 16, 18 of the box. Each accessory furthermore has a feed shaft (not shown) which is driven in rotation in a form-fitting manner, e.g. by means of splines, with a shaft 28 carrying a gear wheel to be driven thereon (FIG. 1C).

A power transmission shaft (not shown) takes mechanical power from a turbine shaft (not shown in the figures) and transmits it to the individual gear wheels 14 of the gear train. For this purpose, the power transmission shaft is rotationally coupled to the gear train by means of one of the gear wheels of the gear train.

According to the invention, each shaft 28 carrying a gear wheel 14 is held by one or more rolling bearing(s) 30 which is/are all carried by the support 12 laterally interposed between the front 16 and rear 18 faces of the box 10. The support 12 can be made of a preferably metallic plate, advantageously perforated like a lattice to limit its weight.

In this embodiment, the front 16 and rear 18 faces form covers used to support the equipment. For this purpose, the covers have fasteners (not shown) that allow the accessories/equipment to be held in place. These fasteners can be threaded holes, studs, V-shaped male flanges allowing the equipment to be attached via an, also V-shaped female collar, or any other means of attaching the equipment.

Figure 2:
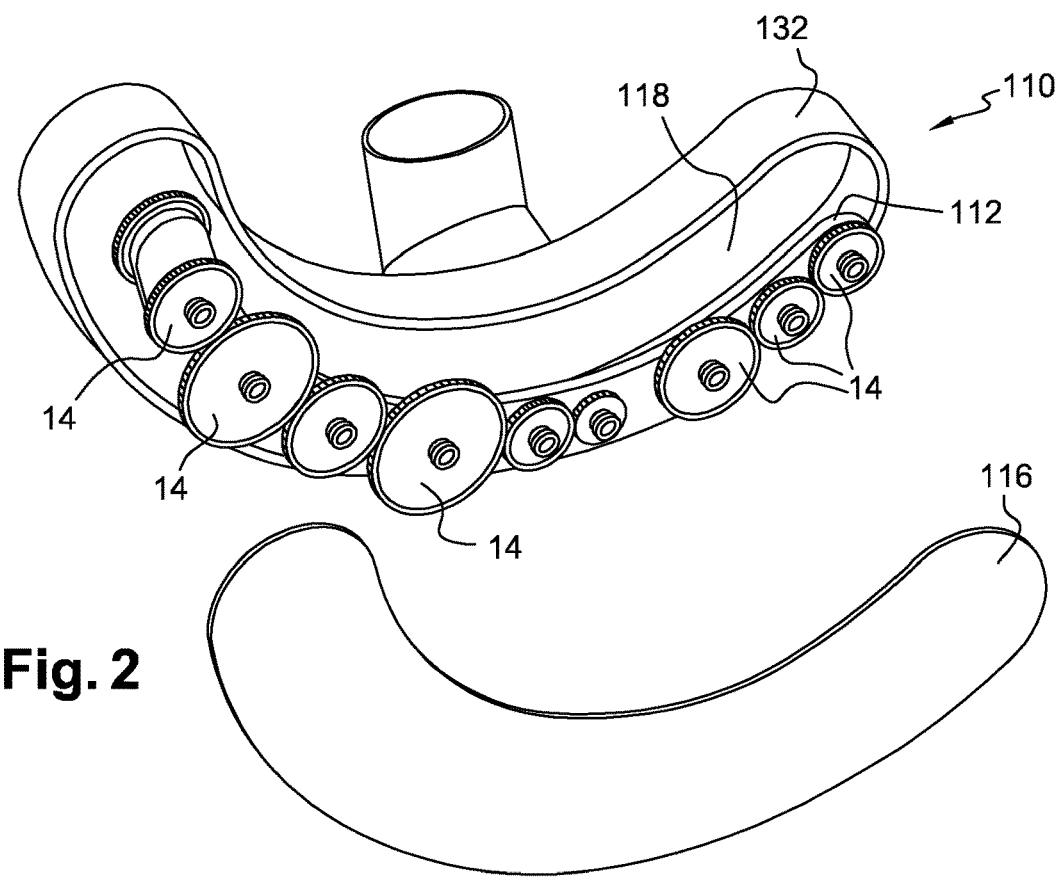
FIG. 2 is a schematic view in perspective of a lower end of a box according to the invention.

In a second embodiment of the invention shown in FIG. 2, the box 110 also comprises a front face 116 and a rear face 118 which are connected to each other by a peripheral rim 132 integral with the rear face 118 which is applied and attached to the front face 116. Thus, the front 116 and rear 118 faces together delimit an enclosure housing the support carrying the gear wheels 14. The accessories are attached to the front and rear faces as is known from the state of the art, as for example explained in connection with the first embodiment.

Figure 3:
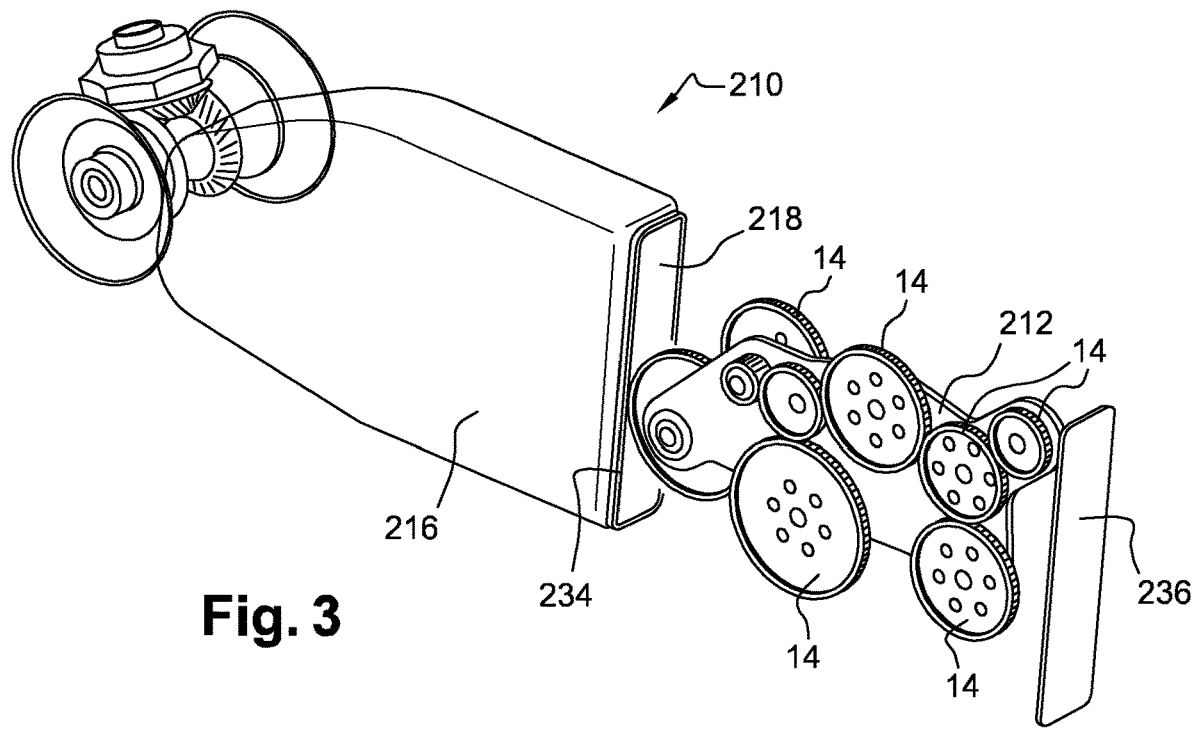
FIG. 3 is a schematic view in perspective of a second embodiment of a box according to the invention.

In a third embodiment of a box 210 according to the invention shown in FIG. 3, the front face 216 and rear face 218 are formed on a one-piece box comprising an opening 234 for mounting the support carrying the kinematic chain comprising the gear train(s). As can be seen, this opening 234 can be closed by a shutter 236. This shut-off device can optionally be made in one piece with the part 212.

As mentioned above, the invention allows the thickness of the box to be reduced in a direction perpendicular to the front and rear faces. The front and rear faces are also simpler to design since they no longer provide support for the kinematic chain and can therefore have more complex shapes that are better adapted to the environment in which the box is to be mounted.

In the various embodiments of the invention shown in the figures, it should be noted that the support may comprise means for lubricating the rolling bearings 28, these means may be, for example, an oil circuit integrated in the thickness of the support 12, 112, 212 so as to convey oil to the bearings. This makes it possible to drill pipes in the support 12, 112, 212 to supply oil to different locations in the box. These holes can be made in the structural arms that make up the support. It is still possible to attach a pipe to the support 12, 112, 212.

The invention claimed is:

1. An accessory relay box for a turbomachine comprising:
    a front lateral face;
    a rear lateral face opposite the front lateral face laterally delimiting the accessory relay box;
    a gear wheel support inserted laterally between the front lateral face and the rear lateral face, said gear wheel support further comprising:
        a plurality of gear wheels meshing together;
        a plurality of central shafts carrying each respective gear wheel of the plurality of gear wheels;
        a plurality of rolling bearings guiding each respective central shaft in rotation, each of the plurality of rolling bearings being carried only by the gear wheel support and each central shaft being carried only by at least one of the plurality of rolling bearings, in a cantilever arrangement.

2. The accessory relay box according to claim 1, wherein said gear wheel support is formed by an apertured plate having a lattice shape with a plurality of rolling bearing receiving boxes.

3. The accessory relay box according to claim 2, wherein the gear wheel support comprises means for lubricating the rolling bearings.

4. The accessory relay box according to claim 2, wherein the gear wheel support comprises means for attaching the accessory relay box to a casing of a gas turbine engine.

5. The accessory relay box according to claim 2, wherein at least one of the front lateral face and the rear lateral face supports equipment.

6. The accessory relay box according to claim 2, in which the front lateral face and the rear lateral face are connected to each other by a peripheral rim forming a sealed enclosure with the front lateral face and the rear lateral face.

7. The accessory relay box according to claim 1, wherein the gear wheel support comprises means for lubricating the rolling bearings.

8. The accessory relay box according to claim 7, wherein the gear wheel support comprises means for attaching the accessory relay box to a casing of a gas turbine engine.

9. The accessory relay box according to claim 7, wherein at least one of the front lateral face and the rear lateral face supports equipment.

10. The accessory relay box according to claim 7, in which the front lateral face and the rear lateral face are connected to each other by a peripheral rim forming a sealed enclosure with the front lateral face and the rear lateral face.

11. The accessory relay box according to claim 1, wherein the gear wheel support comprises means for attaching the accessory relay box to a casing of a gas turbine engine.

12. The accessory relay box according to claim 11, wherein at least one of the front lateral face and the rear lateral face supports equipment.

13. The accessory relay box according to claim 11, in which the front lateral face and the rear lateral face are connected to each other by a peripheral rim forming a sealed enclosure with the front lateral face and the rear lateral face.

14. The accessory relay box according to claim 1, wherein at least one of the front lateral face and the rear lateral face supports equipment.

15. The accessory relay box according to claim 1, in which the front lateral face and the rear lateral face are connected to each other by a peripheral rim forming a sealed enclosure with the front lateral face and the rear lateral face.

16. A gas turbine engine for aeroplanes or helicopters, comprising the accessory relay box according to claim 1.

17. The accessory relay box according to claim 1, wherein the plurality of rolling bearings guiding each central shaft are located apart from the rear lateral face and the front lateral face.

18. The accessory relay box according to claim 1, wherein all rolling bearings supporting each central shaft bearing the gear wheels are located on only one side of each of said gears wheels.

19. An accessory relay box for a turbomachine comprising:
   a front face and a rear face formed on a one-piece box, the one-piece box comprising an opening for mounting a gear wheel support inside the one-piece box, said gear wheel support further comprising:
   a plurality of gear wheels meshing together;
   a plurality of central shafts carrying each respective gear wheel of the plurality of gear wheels;
   a plurality of rolling bearings guiding each respective central shaft in rotation, each of the plurality of rolling bearings being carried only by the gear wheel support and each central shaft being carried only by at least one of the plurality of rolling bearings, in a cantilever arrangement.

20. The accessory relay box according to claim 19, wherein the gear wheel support further comprises a shutter integral with said gear wheel support wherein the shutter closes the opening in the one-piece box when the gear wheel support is mounted inside the one-piece box.

* * * * *